United States Patent
Jain et al.

(10) Patent No.: US 12,493,556 B2
(45) Date of Patent: Dec. 9, 2025

(54) HARDWARE CONTROL SYSTEM TO MODULATE PREFETCHERS BASED ON RUNTIME TELEMETRY

(71) Applicant: Google LLC, Mountain View, CA (US)

(72) Inventors: Akanksha Jain, Mountain View, CA (US); Parthasarathy Ranganathan, San Jose, CA (US); Milad Olia Hashemi, San Francisco, CA (US); Christopher Thomas Kennelly, Croton-on-Hudson, NY (US); Carlos Villavieja Prados, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/654,197

(22) Filed: May 3, 2024

(65) Prior Publication Data

US 2025/0335359 A1     Oct. 30, 2025

Related U.S. Application Data

(60) Provisional application No. 63/639,389, filed on Apr. 26, 2024.

(51) Int. Cl.
*G06F 12/08* (2016.01)
*G06F 12/0862* (2016.01)

(52) U.S. Cl.
CPC .. *G06F 12/0862* (2013.01); *G06F 2212/6022* (2013.01)

(58) Field of Classification Search
CPC .............. G06F 12/0862; G06F 2212/6022
USPC ................................................. 711/141
See application file for complete search history.

(56) References Cited

U.S. PATENT DOCUMENTS

| | | |
|---|---|---|
| 7,702,857 B2 | 4/2010 | Gill et al. |
| 7,707,359 B2 | 4/2010 | Mesard et al. |
| 7,904,661 B2 | 3/2011 | Fluhr et al. |
| 8,285,941 B2 | 10/2012 | Ekanadham et al. |

(Continued)

FOREIGN PATENT DOCUMENTS

| | | |
|---|---|---|
| CN | 101689147 B | 5/2013 |
| WO | 2006130825 A2 | 12/2006 |

OTHER PUBLICATIONS

Srinath, S., et al., "Feedback Directed Prefetching: Improving the Performance and Bandwidth-Efficiency of Hardware Prefetchers", 2007 IEEE 13th International Symposium on High Performance Computer Architecture, IEEE, Feb. 2007. 12 pages.

(Continued)

*Primary Examiner* — Hua J Song
(74) *Attorney, Agent, or Firm* — Lerner David LLP

(57) ABSTRACT

Generally disclosed herein is an approach for dynamically modulating a hardware prefetcher using system software. The hardware prefetcher may be disabled when the amount of the memory bandwidth utilization level is above an upper threshold. The hardware prefetcher may be enabled when the amount of the memory bandwidth utilization level is below a lower threshold. To avoid constantly toggling the hardware prefetcher on and off and allow for smoother transitions, the amount of the memory bandwidth utilization level is observed until it stays above the upper threshold or below the lower threshold for a particular time before the system software changes the latest state of the hardware prefetcher.

18 Claims, 5 Drawing Sheets

(56) References Cited

U.S. PATENT DOCUMENTS

| | | |
|---|---|---|
| 8,490,065 B2 | 7/2013 | Archambault et al. |
| 8,533,437 B2 | 9/2013 | Henry et al. |
| 8,707,282 B2 | 4/2014 | Joshi et al. |
| 9,442,727 B2 | 9/2016 | Chou |
| 9,519,586 B2 | 12/2016 | Gilbert |
| 10,102,134 B2 | 10/2018 | Chishti et al. |
| 10,573,275 B2 | 2/2020 | Romano et al. |
| 11,038,984 B2 | 6/2021 | Cherubini et al. |
| 11,080,052 B2 | 8/2021 | Gschwind et al. |
| 2003/0145314 A1 | 7/2003 | Nguyen et al. |
| 2009/0019229 A1 | 1/2009 | Morrow et al. |
| 2013/0262826 A1 | 10/2013 | Gendler et al. |
| 2014/0108740 A1* | 4/2014 | Rafacz ............... G06F 12/0862 711/137 |
| 2019/0042434 A1* | 2/2019 | Gough ................... H04L 49/70 |
| 2021/0342155 A1 | 11/2021 | Homer |

OTHER PUBLICATIONS

Extended European Search Report for European Patent Application No. 25172487.8 dated Sep. 15, 2025. 8 pages.

* cited by examiner

HARDWARE CONTROL SYSTEM TO MODULATE PREFETCHERS BASED ON RUNTIME TELEMETRY

BACKGROUND

Many modern microprocessor designs contain hardware prefetchers that prefetch instructions to allow data to be loaded ahead of its use. The effectiveness of hardware prefetchers is highly dependent on workload characteristics. The modern design of the hardware prefetchers does not work well for large data centers, as hardware prefetchers often degrade the performance of server machines at scale. Moreover, hardware prefetchers may increase memory latency levels at high memory bandwidth utilization levels, often due to longer queuing delays in the memory system and inefficiencies introduced by inaccurate prefetches.

Hardware prefetchers usually do not impact memory latency when the memory bandwidth utilization level is low. Thus, more aggressive hardware prefetchers may be used to reduce cache miss rates. However, when the memory bandwidth utilization is high and large numbers of server machines operate during peak traffic, different prefetching solutions are needed for a better tradeoff between cache miss rates and memory latency levels.

BRIEF SUMMARY

The technology generally relates to an approach for dynamically modulating a hardware prefetcher using system software. The hardware prefetcher may be disabled when a memory bandwidth utilization level is above an upper threshold. The hardware prefetcher may be enabled when the memory bandwidth utilization level is below a lower threshold. The memory bandwidth utilization level is observed until it stays above the upper threshold or below the lower threshold for a particular time before the system software changes the latest state of the hardware prefetcher. By doing so, constant toggling of the hardware prefetchers on and off may be avoided, therefore allowing for smoother transitions between the hardware prefetches being enabled and disabled.

An aspect of the disclosure provides a system for dynamically modulating a hardware prefetcher, the system comprising: one or more memories storing a first lower threshold of memory bandwidth for a server machine and a second higher threshold of the memory bandwidth for the server machine; and one or more processors in communication with the one or more memories, the one or more processors configured to: detect an amount of memory bandwidth being consumed by the server machine; in response to the amount of memory bandwidth being consumed exceeding the second higher threshold, disable the hardware prefetcher; in response to the amount of memory bandwidth being consumed falling below the first lower threshold, enable the hardware prefetcher; and when the amount of memory bandwidth being consumed is between the first lower threshold and the second higher threshold, retain a most-recently set state.

In some examples, the one or more processors are further configured to monitor the amount of memory bandwidth being consumed using a telemetry.

In some examples, the one or more processors are further configured to enable or disable the hardware prefetcher by writing instructions to a model-specific register (MSR).

In some examples, the one or more processors are further configured to determine the first lower threshold and the second higher threshold based on ablation studies performed on a plurality of server machines, wherein the ablation studies use a first group of server machines running with a plurality of modulating hardware prefetchers and a second group of server machines running with a plurality of hardware prefetchers that are always active.

In some examples, the one or more processors are further configured to determine the first lower threshold and the second higher threshold based on memory bandwidth utilization levels and last-level cache (LLC) miss rates.

In some examples, the one or more processors are further configured to determine the last-level cache (LLC) miss rates using a profile software attached to the server machine.

In some examples, the second higher threshold and the first lower threshold are defined as a percentage relative to the server machine's memory bandwidth saturation threshold.

In some examples, the second higher threshold and the first lower threshold are manually configurable by a user.

In some examples, in response to the memory bandwidth being consumed exceeding the second higher threshold, the one or more processors are further configured to disable the hardware prefetcher after a preconfigured time passes, wherein the hardware prefetcher is configured to remain disabled until the memory bandwidth being consumed falls below the first lower threshold and stays below the first lower threshold for the preconfigured time.

In some examples, in response to the memory bandwidth being consumed falling below the first lower threshold, the one or more processors are further configured to enable the hardware prefetcher after a preconfigured time passes, wherein the hardware prefetcher is configured to remain enabled until the memory bandwidth being consumed exceeds the second higher threshold and stays above the second higher threshold for the preconfigured time.

Another aspect of the disclosure provides for a method for dynamically modulating a hardware prefetcher, the method comprising: detecting, by one or more processors, an amount of memory bandwidth being consumed by a server machine; in response to the amount of memory bandwidth being consumed exceeding a second higher threshold, disabling, by the one or more processors, the hardware prefetcher; in response to the amount of memory bandwidth being consumed falling below a first lower threshold, enabling, by the one or more processors, the hardware prefetcher; and when the amount of memory bandwidth being consumed is between the first lower threshold and the second higher threshold, retaining, by the one or more processors, a most-recently set state.

In some examples, the method further comprises monitoring, by the one or more processors, the amount of memory bandwidth being consumed using a telemetry.

In some examples, the method further comprises enabling or disabling, by the one or more processors, the hardware prefetcher by writing instructions to a model-specific register (MSR).

In some examples, the method further comprises determining, by the one or more processors, the first lower threshold and the second higher threshold based on ablation studies performed on a plurality of server machines, wherein the ablation studies use a first group of server machines running with a plurality of modulating hardware prefetchers and a second group of server machines running with a plurality of hardware prefetchers that are always active.

In some examples, the method further comprises determining, by the one or more processors, the first lower threshold and the second higher threshold based on memory bandwidth utilization levels and last-level cache (LLC) miss rates.

In some examples, the method further comprises determining, by the one or more processors, the last-level cache (LLC) miss rates using a profile software attached to the server machine.

In some examples, the second higher threshold and the first lower threshold are defined as a percentage relative to the server machine's memory bandwidth saturation threshold.

In some examples, the second higher threshold and the first lower threshold are manually configurable by a user.

In some examples, the method further comprises in response to the memory bandwidth being consumed exceeding the second higher threshold, disabling, by the one or more processors, the hardware prefetcher after a preconfigured time passes, and causing, by the one or more processors, the hardware prefetcher to remain disabled until the memory bandwidth being consumed falls below the first lower threshold and stays below the first lower threshold for the preconfigured time.

In some examples, the method further comprises in response to the memory bandwidth being consumed falling below the first lower threshold, enabling, by the one or more processors, the hardware prefetcher after a preconfigured time passes, and causing, by the one or more processors, the hardware prefetcher to remain enabled until the memory bandwidth being consumed exceeds the second higher threshold and stays above the second higher threshold for the preconfigured time.

DETAILED DESCRIPTION

Figure 1:
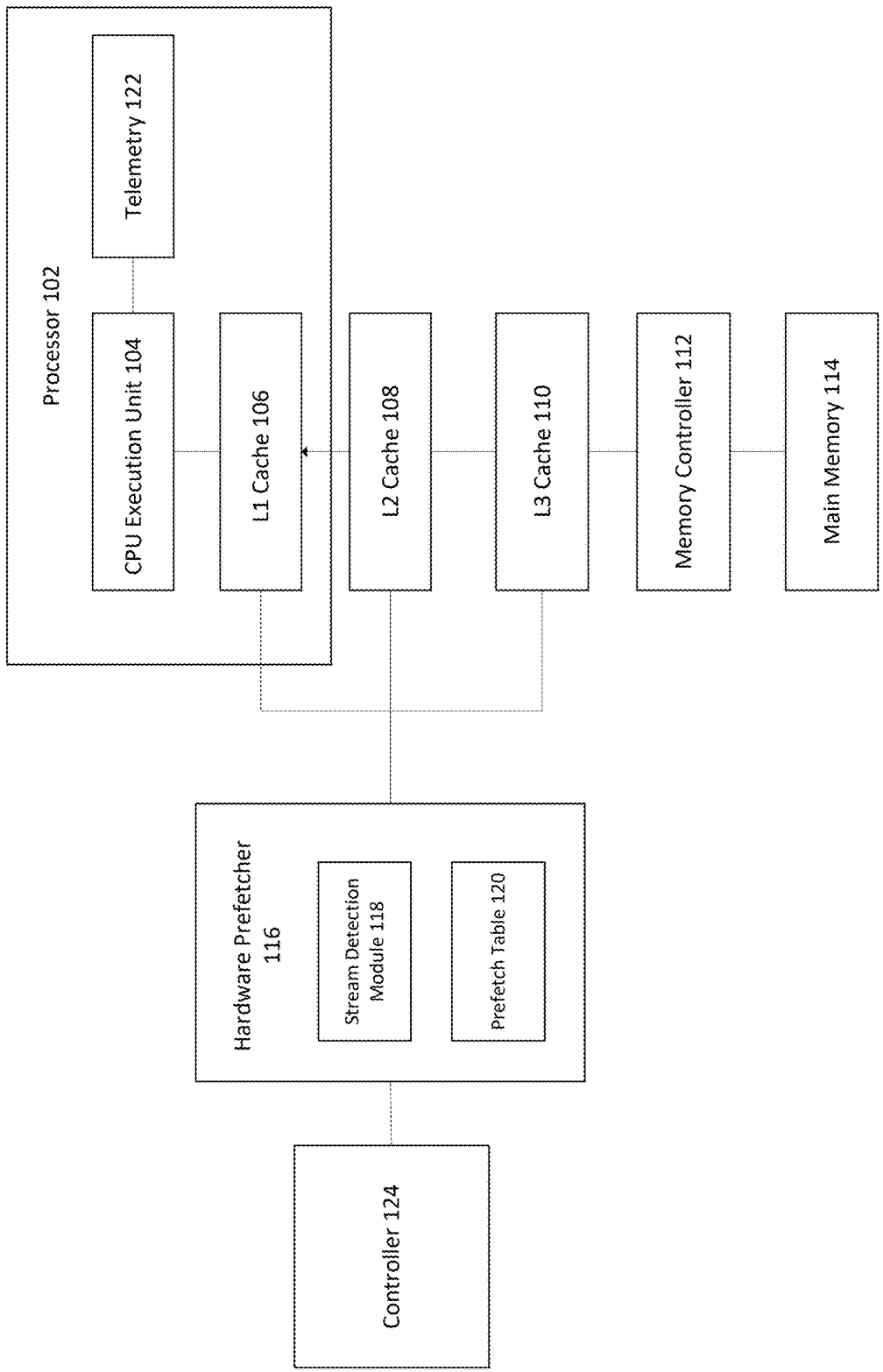
FIG. 1 depicts a hardware prefetching system according to aspects of the disclosure.

Generally disclosed herein is an approach for disabling or enabling a hardware prefetcher based on the amount of memory bandwidth utilization. An upper threshold and a lower threshold may be determined based on measurements of memory latency levels and memory bandwidth utilization levels of one or more of server machines. The approach may also include determining a threshold time before a change in the state of the hardware prefetchers takes effect.

For example, hardware prefetchers may be enabled while the memory bandwidth consumed is below a lower threshold. When the amount of the memory bandwidth consumed exceeds the lower threshold, but remains below the upper threshold, the hardware prefetchers may remain enabled. When the memory bandwidth utilization exceeds the upper threshold, the hardware prefetcher may remain enabled until the memory bandwidth utilization exceeds the upper threshold for a particular time period, at which time the hardware prefetchers may be disabled. When the amount of the memory bandwidth being consumed falls below the upper threshold, the hardware prefetchers may remain disabled until the amount of the memory bandwidth being consumed stays below the lower threshold for a particular time period. At or after this time period the hardware prefetchers may be enabled again.

According to some examples, the thresholds for disabling or enabling hardware prefetchers may be determined based on measurements of memory latency levels and memory bandwidth utilization levels of clusters of server machines. For example, server-level memory bandwidth telemetry may be used to collect cluster-wide information, such as LLC misses of the clusters of the server machines. According to some examples, such information may be collected at regular or irregular periods of time, such as every few milliseconds, every second, every several seconds, several times a minute, or at any other frequency.

Profiling software and/or hardware, such as performance monitoring units (PMUs) may monitor memory bandwidth levels on every server or a subset of servers and store the monitored information in memory residing within a controller. Profiling may occur at regular or irregular periods of time, such as every second. The profiled memory bandwidth level may be provided to or otherwise retrieved by a controller, such as controller hardware or software. The controller may receive or retrieve both memory bandwidth level information and memory latency information, described further herein, to determine the thresholds.

The upper and lower thresholds can be set as a percentage of a server's memory bandwidth saturation threshold, which corresponds to the maximum memory bandwidth capacity of the server. In some examples, lower and upper memory bandwidth thresholds can be manually configured by a user.

In other examples, the thresholds can be set to prevent the hardware prefetchers from enabling or disabling. For instance, the lower threshold may be set to 0% and the upper threshold may be set to 100%, such that the hardware prefetchers are always enabled. In another example, when the upper threshold is set to 0%, the hardware prefetchers are always disabled.

For actuating prefetch controls, the controller may enable and disable the hardware prefetchers by writing to the model-specific registers (MSRs). The MSRs may include control registers or interfaces provided by processors such that the controller may interact with a variety of features, performance monitoring, checking processor status, etc.

FIG. 1 depicts a hardware prefetching system. Computing environment 100 may include processor 102 comprising CPU execution unit 104, L1 cache 106, and telemetry 122. Processor 102, L2 cache 108, L3 cache 110, memory controller 112, main memory 114, hardware prefetcher 116, and controller 124 may be implemented on a single computing device or on more than one computing device. For example, a computing device may include processor 102, L2 cache 108, L3 cache 110, memory controller 112, main memory 114, and hardware prefetcher 116. Another computing device may include controller 124.

CPU execution unit 104 may be communicably coupled with telemetry 122. CPU execution unit 104 may load and store data in accordance with prefetch instructions received from hardware prefetcher 116. CPU execution unit 104 may be communicably coupled with L1 cache 106, L2 cache 108, and L3 cache 110.

Memory controller 110 may be configured to control access to main memory 114, L1 cache 106, L2 cache 108, and/or L3 cache 110 by execution unit 104. Memory controller 112 may be configured to coordinate data transfer between main memory 114 and each of caches 106-110. Main memory 114 may include memory such as random-access memory (RAM) that stores operating systems, applications, data, etc.

Hardware prefetcher 116 may be communicably coupled with L1 cache 106, L2 cache 108, and L3 cache 110. Hardware prefetcher 116 may be configured to identify patterns in memory accesses by examining the stream of memory accesses in one or more of L1 cache 106, L2 cache 108, and L3 cache 110. Hardware prefetcher 116 may monitor the memory access pattern within each of the above caches using stream detection module 118 and predict what data will be accessed in the future. The data that has been accessed in each cache and the predicted data access can be stored in prefetch table 120. Hardware prefetcher 116 may be communicable with controller 124.

Controller 124 may be configured to disable or enable hardware prefetcher 116 based on an upper threshold and a lower threshold of memory bandwidth utilization levels.

Telemetry 122 is coupled to CPU execution unit 104. Telemetry 122 may monitor memory latency levels and memory bandwidth utilization levels. According to some examples, telemetry 122 may comprise a performance monitoring unit (PMU) that monitors the memory bandwidth utilization levels of L1 cache 106, L2 cache 08, L3 cache 110, and/or main memory 114. Telemetry 122 may also comprise a memory bandwidth monitoring (MBM) unit that can monitor the memory bandwidth utilization levels of L1 cache 106, L2 cache 18, L3 cache 110, and/or main memory 114. Telemetry 122 can monitor the aforementioned memory performance indicators when both hardware prefetcher 116 is enabled or disabled.

Figure 2:
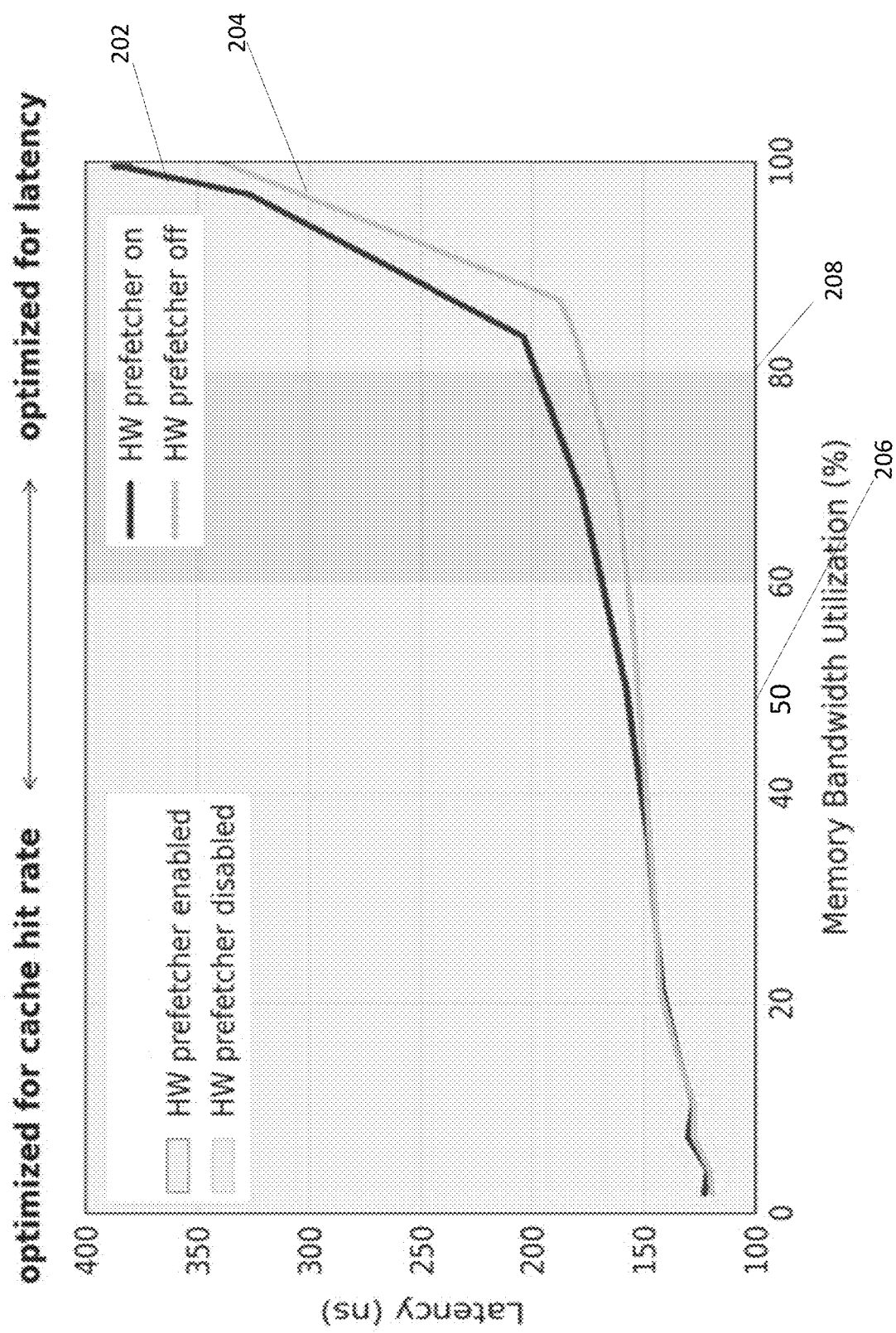
FIG. 2 depicts a graph illustrating relationships between memory latency levels and memory bandwidth utilization levels when a hardware prefetcher is enabled or disabled according to aspects of the disclosure.

FIG. 2 depicts a graph illustrating relationships between memory latency level and memory bandwidth utilization level when a hardware prefetcher is enabled or disabled, respectively. The graph depicted in FIG. 2 was generated from the results of hardware ablation studies on large numbers of server machines in a data center. The relationships between memory latency level and memory bandwidth utilization level may be used to identify appropriate upper and lower thresholds. The appropriate upper and lower thresholds may be selected or configured to allow the overall performance measurements across the server machines in the data center to be maximized.

Graph line 202 represents a relationship between memory latency level and memory bandwidth utilization level when hardware prefetchers are enabled. Graph line 204 represents a relationship between memory latency level and memory bandwidth utilization level when the hardware prefetchers are disabled. When the memory bandwidth utilization level is "low", around 40% of memory bandwidth utilization, the measurements of the memory latency level for both graph lines show similar measurements, which may indicate that the hardware prefetchers have little impact on the memory latency level. It is not until the memory bandwidth utilization level is higher, at about 50%, where the impact on the memory latency level by the hardware prefetches is more readily seen as the memory latency level difference between the two graph lines increases as the memory bandwidth utilization level approaches the memory bandwidth utilization level at point 208. When the memory bandwidth utilization level exceeds 80%, the memory latency level difference between graph lines 202 and 204 progressively decreases, although latency for both graph lines 202 and 204 increases exponentially.

According to an example, a controller, such as controller 124, may determine that the memory bandwidth utilization level at point 206 is a lower threshold and the memory bandwidth utilization level at point 208 is an upper threshold. When the memory bandwidth utilization level is below the lower threshold or memory bandwidth utilization at point 206, the controller may enable the hardware prefetcher and continue to prefetch data based on its predicted use. On the other hand, when the memory bandwidth utilization level is above the memory bandwidth utilization level at point 208, the hardware prefetching system may disable the hardware prefetcher to reduce the memory latency level.

Figure 3:
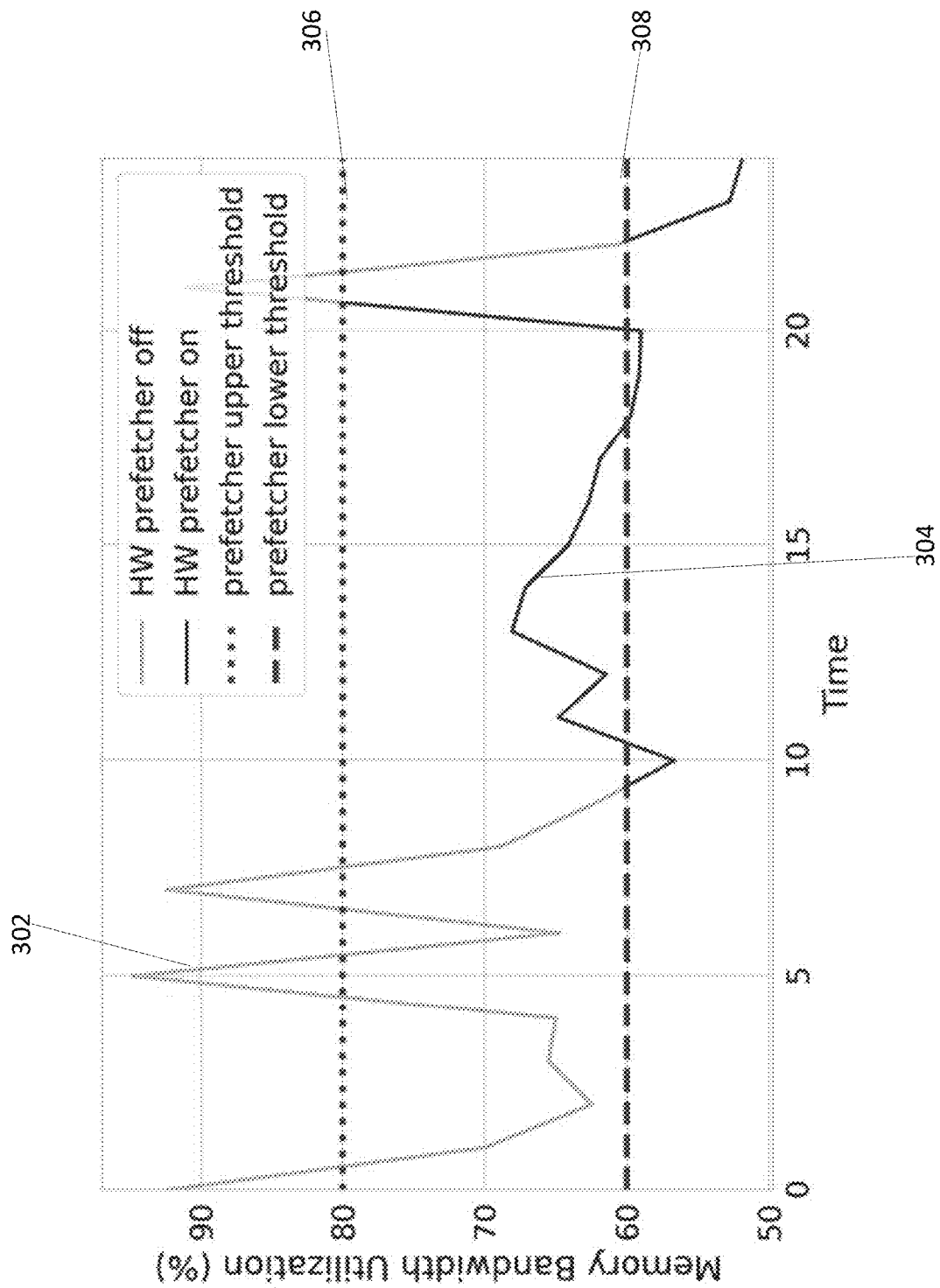
FIG. 3 depicts a graph illustrating a state of the hardware prefetcher relative to an upper threshold and lower threshold of memory bandwidth utilization levels over time according to aspects of the disclosure.

FIG. 3 depicts a graph illustrating the state of a hardware prefetcher relative to an upper threshold and lower threshold of memory bandwidth utilization level over time. The y-axis represents memory bandwidth utilization levels, and the x-axis represents time(s). According to some examples, the hardware prefetching system may utilize hysteresis in the controller to allow for smoother transitions of turning off and on of a hardware prefetcher. The upper threshold 306 may be used to determine whether the hardware prefetcher should be disabled, and the lower threshold 308 may be used to determine whether the hardware prefetcher should be enabled again. Additionally, the hardware prefetching system may define a time duration during which the memory bandwidth utilization level must stay above the upper threshold 306 or below the lower threshold 308 before the controller will change the state of the hardware prefetcher. Graph line 304 (illustrated using a black line) represents the memory bandwidth utilization level over time when the hardware prefetcher is active. Graph line 302 (illustrated using a gray line) represents the memory bandwidth utilization level over time when the hardware prefetcher is inactive.

At time t=0, the hardware prefetcher may be disabled, as memory utilization is above the upper threshold 306. For this example, it may be assumed that at time t=0, memory utilization was above the upper threshold 306 for the necessary time needed to disengage the hardware prefetcher. Despite the memory bandwidth utilization level falling below the upper threshold 306 a few times between t=0 and around t=10, the hardware prefetcher is not turned on because the memory bandwidth utilization level does not fall below the lower threshold 308 for a set period of time. It is not until slightly before time t=10, the memory bandwidth utilization level falls below the lower threshold 308 and stays below the lower threshold 308 for a sustained period of time, that the hardware prefetcher is then enabled. Before t=20, the hardware prefetcher may be left on even though the memory bandwidth utilization level exceeds the lower threshold 308 because the memory bandwidth utilization level does not exceed the upper threshold 306. The period of time the memory bandwidth utilization level is required to stay above the upper threshold 306 before the hardware prefetcher is disabled may be X seconds. The period of time the memory bandwidth utilization level is required to stay below the lower threshold 308 before the hardware prefetcher is enabled may be Y seconds. The time periods may be determined empirically and configurable by a user.

Figure 4:
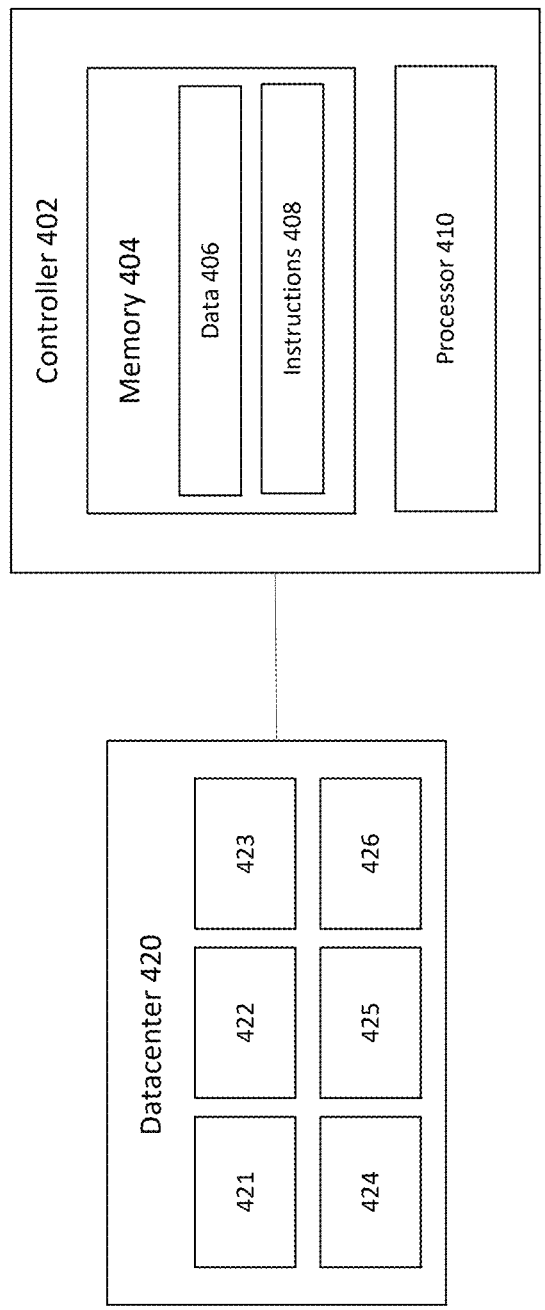
FIG. 4 depicts an example server system according to aspects of the disclosure.

FIG. 4 depicts an example server system, including a server device, such as controller 402. Controller 402 may be compared to controller 124. Controller 402 may be implemented by one or more server computing devices. Controller 402 may include hardware configured to monitor the states of hardware prefetchers implemented in each of the computing devices 421-426 and measure memory latency levels and memory bandwidth utilization levels of memories within each computing device 421-426. It is to be understood that for the purpose of the present disclosure, the terms computing devices, servers, server computing devices and server machines may be used interchangeably. Controller 402 may remotely enable or disable the hardware prefetchers based on the change of memory bandwidth utilization levels over time. Controller 402 may enable one or more hardware prefetchers implemented in computing devices 421-426 when the memory bandwidth utilization level falls below a lower threshold. Controller 402 may disable one or more hardware prefetchers when the memory bandwidth utilization level exceeds an upper threshold. According to one example, controller 402 may reside within and control hardware prefetchers of the computing devices located in a particular data center. According to other examples, the controller 402 may be coupled to one or more data centers 420, such as through a network, and may manage operations of multiple data centers. In some examples, more than one controller may control hardware prefetchers of computing devices within a single data center.

Data center 420 may be positioned at a considerable distance from controller 402 and/or other data centers (not shown). The one or more computing devices 421-426 may be processors, servers, general purpose computers, cards, cells, or the like. In some examples, the computing devices in the data center may have different processing capabilities and handle different workloads. While only a few of these computing devices are shown, it should be understood that each data center 420 may include any number of computing devices. The number of computing devices in a first datacenter may differ from the number of computing devices in a second datacenter. Moreover, it should be understood that the number of computing devices in each data center may vary over time, for example, as computing devices are removed, replaced, upgraded, or expanded.

In some examples, controller 402 may communicate with each computing device 421-426 in data center 420 and may facilitate the execution of programs. For example, controller 402 may track the capacity, status, workload, or other information of each computing device, and use such information to enable or disable each hardware prefetcher of each computing device 421-426. Controller 402 may include processor 410 and memory 404, including data 406 and instructions 408. In other examples, such operations may be performed by one or more of computing devices 421-426 in data center 420, and an independent controller may be omitted from the system.

Controller 402 may contain a processor 410, memory 404, and other components typically present in server computing devices. Memory 404 can store information accessible by processor 410, including instructions 408 that can be executed by processor 410. Memory can also include data 406 that can be retrieved, manipulated, or stored by the processor 410. Memory 404 may be a type of non-transitory computer-readable medium capable of storing information accessible by processor 410, such as a hard drive, solid-state drive, tape drive, optical storage, memory card, ROM, RAM, DVD, CD-ROM, write-capable, and read-only memories. Processor 410 can be a well-known processor or other lesser-known types of processors. Alternatively, processor 410 can be a dedicated controller such as an ASIC.

Instructions 408 can be a set of instructions executed directly, such as machine code, or indirectly, such as scripts, by processor 410. In this regard, the terms "instructions," "steps" and "programs" can be used interchangeably herein. Instructions 408 can be stored in object code format for direct processing by processor 410, or other types of computer language including scripts or collections of independent source code modules that are interpreted on demand or compiled in advance. Instructions 408 may include instructions for enabling or disabling hardware prefetchers implemented in each computing device 421-426 as described above.

Data 406 can be retrieved, stored, or modified by processor 410 in accordance with instructions 408. For instance, although the system and method are not limited by a particular data structure, data 406 can be stored in computer registers, in a relational database as a table having a plurality of different fields and records, or XML documents. Data 406 can also be formatted in a computer-readable format such as, but not limited to, binary values, ASCII, or Unicode. Moreover, data 406 can include information sufficient to identify relevant information, such as numbers, descriptive text, proprietary codes, pointers, references to data stored in other memories, including other network locations, or information that is used by a function to calculate relevant data.

Although FIG. 4 functionally illustrates processor 410 and memory 404 as being within the same block, processor 410 and memory 404 may include multiple processors and memories that may or may not be stored within the same physical housing. For example, some of instructions 408 and data 406 can be stored on a removable CD-ROM and others within a read-only computer chip. Some or all of the instructions and data can be stored in a location physically remote from, yet still accessible by, processor 410. Similarly, processor 410 can actually include a collection of processors, which may or may not operate in parallel.

Figure 5:
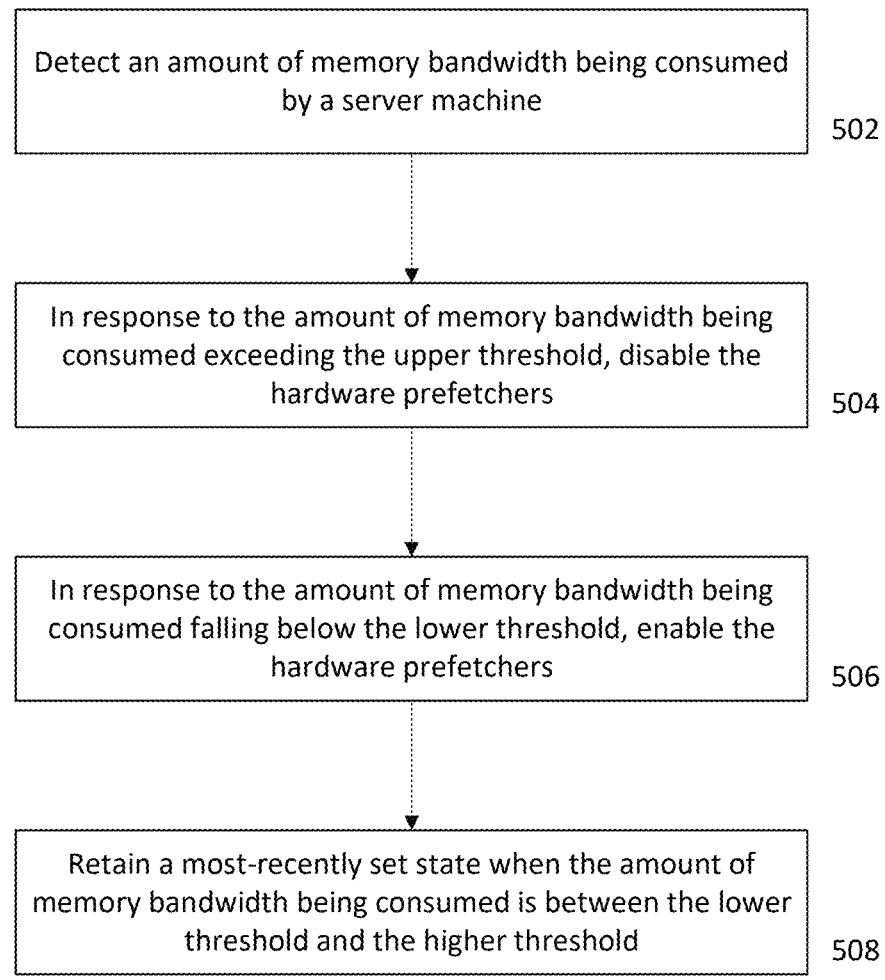
FIG. 5 depicts a flow diagram illustrating an example method according to aspects of the disclosure.

FIG. 5 depicts a flow diagram illustrating an example hardware prefetcher modulation method. According to block 502, an amount of memory bandwidth being consumed by a server machine may be detected. The controller may monitor both the memory bandwidth utilization level and memory latency level of each memory located in each server machine. Based on ablation studies performed on large numbers of server machines within a data center, a lower threshold and an upper threshold may be determined. When the memory bandwidth utilization level is below the lower threshold, whether the hardware prefetchers are turned on or off does not impact the memory latency level. When the memory bandwidth utilization level is above the upper threshold, the hardware prefetchers increase the memory latency level at a significant level.

According to block 504, in response to the amount of memory bandwidth being consumed exceeding the upper threshold, hardware prefetchers are disabled. When the controller detects the memory bandwidth utilization level exceeding the upper threshold, the controller may interact with the respective server machine's processors to disable the respective hardware prefetcher to decrease the memory latency level.

According to block 506, in response to the amount of memory bandwidth being consumed falling below the lower threshold, the hardware prefetchers may be enabled. When the controller detects the memory bandwidth utilization level falling below the lower threshold, the controller may command the respective server machine's processors to enable the respective hardware prefetcher to prefetch data ahead of its potential use.

According to block 508, the most recently set states of the hardware prefetchers may be retained when the amount of the memory bandwidth being consumed lies between the lower threshold and the higher threshold. When the amount of the memory bandwidth utilization level lies between the lower threshold and upper threshold, the controller may be configured to communicate with each respective hardware prefetcher to remain enabled even after the amount of the memory bandwidth being consumed exceeds the upper threshold. Only after the amount of the memory bandwidth being consumed stays above the upper threshold for a predetermined period, the controller may be configured to disable each respective hardware prefetcher. When the amount of the memory bandwidth being consumed falls below the upper threshold, the controller may be configured to maintain each respective hardware prefetcher disabled until the amount of the memory bandwidth being consumed falls below the lower threshold and stays below the lower threshold for a particular time period. After the amount of the memory bandwidth being consumed stays below the lower threshold for the particular time period, the controller may be configured to enable the hardware prefetcher again.

Although the technology herein has been described with reference to particular examples, it is to be understood that these examples are merely illustrative of the principles and applications of the present technology. It is, therefore, to be understood that numerous modifications may be made and that other arrangements may be devised without departing from the spirit and scope of the present technology as defined by the appended claims.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as" "such as," "including," and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system for dynamically modulating a hardware prefetcher, the system comprising:
   one or more memories storing a first lower threshold of memory bandwidth for a server machine and a second higher threshold of the memory bandwidth for the server machine; and
   one or more processors in communication with the one or more memories, the one or more processors configured to:
   determine the first lower threshold and the second higher threshold based on memory bandwidth utilization levels and last-level cache (LLC) miss rates;
   detect an amount of memory bandwidth being consumed by the server machine;
   in response to the amount of memory bandwidth being consumed exceeding the second higher threshold, disable the hardware prefetcher;
   in response to the amount of memory bandwidth being consumed falling below the first lower threshold, enable the hardware prefetcher; and
   when the amount of memory bandwidth being consumed is between the first lower threshold and the second higher threshold, retain a most-recently set state.

2. The system of claim 1, wherein the one or more processors are further configured to monitor the amount of memory bandwidth being consumed using a telemetry.

3. The system of claim 1, wherein the one or more processors are further configured to enable or disable the hardware prefetcher by writing instructions to a model-specific register (MSR).

4. The system of claim 1, wherein the one or more processors are further configured to determine the first lower threshold and the second higher threshold based on ablation studies performed on a plurality of server machines, wherein the ablation studies use a first group of server machines running with a plurality of modulating hardware prefetchers and a second group of server machines running with a plurality of hardware prefetchers that are always active.

5. The system of claim 1, wherein the one or more processors are further configured to determine the last-level cache (LLC) miss rates using a profile software attached to the server machine.

6. The system of claim 1, wherein the second higher threshold and the first lower threshold are defined as a percentage relative to the server machine's memory bandwidth saturation threshold.

7. The system of claim 1, wherein the second higher threshold and the first lower threshold are manually configurable by a user.

8. The system of claim 1, wherein in response to the memory bandwidth being consumed exceeding the second higher threshold, the one or more processors are further configured to disable the hardware prefetcher after a preconfigured time passes, wherein the hardware prefetcher is configured to remain disabled until the memory bandwidth being consumed falls below the first lower threshold and stays below the first lower threshold for the preconfigured time.

9. The system of claim 1, wherein in response to the memory bandwidth being consumed falling below the first lower threshold, the one or more processors are further configured to enable the hardware prefetcher after a preconfigured time passes, wherein the hardware prefetcher is configured to remain enabled until the memory bandwidth being consumed exceeds the second higher threshold and stays above the second higher threshold for the preconfigured time.

10. A method for dynamically modulating a hardware prefetcher, the method comprising:
   detecting, by one or more processors, an amount of memory bandwidth being consumed by a server machine;
   determining, by the one or more processors, a first lower threshold and a second higher threshold based on memory bandwidth utilization levels and last-level cache (LLC) miss rates;
   in response to the amount of memory bandwidth being consumed exceeding the second higher threshold, disabling, by the one or more processors, the hardware prefetcher;
   in response to the amount of memory bandwidth being consumed falling below the first lower threshold, enabling, by the one or more processors, the hardware prefetcher; and
   when the amount of memory bandwidth being consumed is between the first lower threshold and the second higher threshold, retaining, by the one or more processors, a most-recently set state.

11. The method of claim 10, further comprising monitoring, by the one or more processors, the amount of memory bandwidth being consumed using a telemetry.

12. The method of claim 10, further comprising enabling or disabling, by the one or more processors, the hardware prefetcher by writing instructions to a model-specific register (MSR).

13. The method of claim 10, further comprising determining, by the one or more processors, the first lower threshold and the second higher threshold based on ablation studies performed on a plurality of server machines, wherein the ablation studies use a first group of server machines running with a plurality of modulating hardware prefetchers and a second group of server machines running with a plurality of hardware prefetchers that are always active.

14. The method of claim 10, further comprising determining, by the one or more processors, the last-level cache (LLC) miss rates using a profile software attached to the server machine.

15. The method of claim 10, wherein the second higher threshold and the first lower threshold are defined as a percentage relative to the server machine's memory bandwidth saturation threshold.

16. The method of claim 10, wherein the second higher threshold and the first lower threshold are manually configurable by a user.

17. The method of claim 10, further comprising:
in response to the memory bandwidth being consumed exceeding the second higher threshold, disabling, by the one or more processors, the hardware prefetcher after a preconfigured time passes, and causing, by the one or more processors, the hardware prefetcher to remain disabled until the memory bandwidth being consumed falls below the first lower threshold and stays below the first lower threshold for the preconfigured time.

18. The method of claim 10, further comprising:
in response to the memory bandwidth being consumed falling below the first lower threshold, enabling, by the one or more processors, the hardware prefetcher after a preconfigured time passes, and causing, by the one or more processors, the hardware prefetcher to remain enabled until the memory bandwidth being consumed exceeds the second higher threshold and stays above the second higher threshold for the preconfigured time.

* * * * *